2,995,427
GASOLINE COMPOSITION
Harrison W. Sigworth, El Cerrito, and Maurice R. Barusch, Richmond, Calif., assignors to California Research Corporation, San Francisco, Calif., a corporation of Delaware
No Drawing. Filed Dec. 19, 1956, Ser. No. 629,233
3 Claims. (Cl. 44—53)

This invention relates to an improved hydrocarbon fuel composition suitable for use in an internal combustion engine, and more particularly, to a fuel composition containing addition agents, which, acting in concert, prevent the accumulation of an aqueous phase in the fuel system of an internal combustion engine.

The presence of water in the fuel systems of internal combustion engines has been a problem to operators for years. If water is present in the fuel, for example from contamination or atmospheric condensation, two separate liquid phases will form in the fuel tank; an upper hydrocarbon layer and a lower water phase. In order to prevent this lower phase from being passed from the tank into the fuel system, manufacturers of these systems draw off the fuel in its passage to the engine from a point somewhat above the lowest portion of the tank. However, the periodic fillings of the tank with water-contaminated fuel tends to raise the level of the aqueous lower layer to a point where the water is passed along the fuel into the fuel system. This leads, at best, to erratic engine performance and, in cold weather conditions, the formation of ice in the lines, etc., of the fuel system, thus stopping fuel flow. Further difficulties can be encountered by the rusting of that portion of the fuel tank which is in frequent contact with the aqueous phase. Additionally, in the case of spark-ignition engines where gasoline is the fuel, it has been found that repeated engine stalling can occur in cool, humid climatic conditions due to the formation of ice in the carburetor of the engine. On a cool, moist day gasoline evaporating in the carburetor exerts sufficient refrigerating effect to condense and freeze moisture present in the air entering the carburetor.

In order to alleviate the problem of water contamination of gasoline at low temperatures, it has been suggested to include various alcohols in the gasoline, the theory being that since the alcohol is soluble in both hydrocarbons and water, the alcohol should entrain in the gasoline any water present. We have found that such a theory is not substantiated by actual fact. For example, in a gasoline-water-methanol system, almost all of the methanol enters the water phase or water droplets. Thus, although two distinct phases result, the freezing point of the water-alcohol phase will be depressed, thereby allowing ice-free operation at temperatures well below that allowable in the absence of the alcohol. However, such a solution is only a partial one, inasmuch as rusting will still occur where the aqueous phase is in prolonged contact with steel portions of the fuel system, such as the storage tank. Furthermore, upon the build-up of the aqueous layer in the tank, portions of this phase will eventually be passed into the carburetor and the engine causing erratic performance.

We have found that both the rusting and icing problems encountered in fuel systems of internal combustion engines operating on water-contaminated ("wet") fuel can be effectively alleviated by incorporating within the fuel a relatively small amount of methanol and a plurality of rather specific compounds. Our fuel composition comprises, in addition to the base fuel, a minor proportion of methanol, from about 0.001 to about 0.2 volume percent of a fatty acid amide of hydroxyethyl ethylenediamine, said fatty acid containing from about 10 to 20 carbon atoms per molecule, and from about 0.00025 to about 0.05 volume percent of an oil-soluble ammonium sulfonate.

It has been found that when the amide-sulfonate-methanol additive combination of the subject invention is incorporated in a water-contaminated fuel, a water-fuel emulsion or dispersion is formed that prevents the accumulation of water in the fuel system, thereby effectively preventing the rusting of any part of said system. The additive combination prevents rusting in two ways: first, it removes much of the water that causes the rusting and secondly, the additive is a true rust inhibitor in itself. The formation of the noted emulsion or dispersion causes the water in the fuel to be carried through the fuel system into the engine where it is consumed harmlessly, with none of the erratic operation that is present when a simple alcohol-water phase slugs through. The methanol in the subject fuel composition effectively prevents the formation of any ice within the fuel system, even if a portion of the emulsion should locate itself temporarily in the fuel lines or carburetor. Additionally, in the case of gasoline fuels, the additive combination effectively prevents carburetor icing under cool, moist weather conditions.

While the subject additive combination may be incorporated in any hydrocarbon fuel where rusting or icing is a problem, such as diesel fuels and the like, the improving effect of the additives is particularly found in gasoline fuels employed in spark-ignition internal combustion engines. Accordingly, the base fuel may be any hydrocarbon fraction suitable for use as a fuel in an internal combustion engine. Ordinarily, the base fuel is a mixture of hydrocarbons derived from petroleum crude oils. However, fuels derived from other sources, such as shale oil or synthetic hydrocarbons obtained from the Fischer-Tropsch process, etc., can be improved by the subject invention. Additionally, the present additive combination is suitable for use in straight-run, thermally or catalytically cracked fractions. Preferably, the base fuel is a mixture of hydrocarbons boiling generally in the range of from about 100° to 450° F. It must be understood that the subject additive combination can be employed in fuels containing other additives such as knock-suppressing agents (for example, tetra ethyl lead), dyes, gum and oxidation inhibitors, and the like.

As noted above, the additive composition comprises a combination of methanol, a fatty acid amide of hydroxyethyl ethylenediamine and an oil-soluble ammonium sulfonate. The fatty acid amide of the invention may be prepared by the reaction of equimolar quantities of hydroxyethyl ethylenediamine with a fatty acid containing from about 10 to 20 carbon atoms per molecule. For example, when employing the preferred oleic acid, the initial product is principally the substituted alkyl-ammonium oleate formed by simple acid-base reaction. As the reaction progresses (very slowly at room temperature and much more rapidly at higher temperatures, as for example, from 200° to 250° F.), the salt is converted to the monoamide of the present invention, liberating a mole of water. Further dehydration by increasing the temperature leads to the formation of the imidazoline. Similar reactions occur at approximately the same temperatures if methyloleate is substituted for the oleic acid.

Two possible monoamides exist: the secondary, or linear amide,

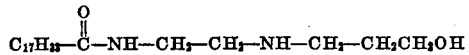

and the tertiary or branched amide,

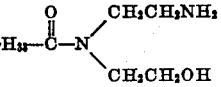

Both, either singly or in admixture, are suitable insofar as the present invention is concerned. Additionally, these amides can be obtained by the hydrolysis of the imidazoline at ambient temperatures, or, more rapidly, at higher temperatures. As noted above, the preferred fatty acid is oleic, but suitable are those higher fatty acids having 10 to 20 carbon atoms per molecule such as lauric, myristic, palmitic, stearic and linoleic.

The fatty acid amide is incorporated in the base fuel in an amount of from about 0.001 to about 0.2 volume percent (based on the final gasoline) and, preferably, from about 0.01 to 0.05 volume percent.

The ammonium sulfonate portion of the additive combination is present in an amount of from about 0.00025 to about 0.05, and preferably, from about 0.0025 to 0.0125 volume percent. The ammonium sulfonate may be derived from any oil-soluble high molecular weight organic sulfonic acid. Sulfonic acids having a molecular weight between about 200 to about 800 are suitable, although it is preferred to employ sulfonic acids having molecular weights above about 400. These acids may be either aliphatic or aromatic sulfonic acids with the principal specification being the presence of the sulfonate radical and an essentially hydrocarbon organic radical of sufficient molecular weight to impart oil-solubility to the compound. Illustrative specific sulfonic acids which can be employed are polypropylene benzene sulfonic acids, petroleum mahogany sulfonic acids, dodecane sulfonic acids, and synthetic alkyl aromatic sulfonic acids in which the alkyl radical contains from about 14 to 20 carbon atoms.

The methanol is incorporated in the base fuel in an amount of from about 0.1 to about 5.0 and preferably from about 0.5 to 2.5 volume percent of the total gasoline composition. Accordingly, the proportion of the fatty acid amide in the fuel containing from about 0.1 to about 5.0 volume percent of methanol lies in the range of 1.0 to 4.0 volume percent, based on the methanol. Likewise, the proportion of the ammonium sulfonate in the fuel containing these proportions of methanol lies in the range of 0.25 to 1.0 volume percent, based on the methanol.

While all reference heretofore has been with respect to the direct incorporation of the subject additive combination in the base fuel, it is to be understood that it is also contemplated that an additive concentrate can be prepared for incorporation into conventional fuels in the field. In fact, in most cases, it is preferable that the additive combination be incorporated in the base fuel in this manner. Such an additive concentrate will contain the combination of the methanol, the fatty acid amide and the oil-soluble ammonium sulfonate (in amounts sufficient, when included in the base fuel, to fall within the respective ranges set forth above) dissolved in a hydrocarbon solvent carrier. The solvent carrier may contain hydrocarbons boiling in the gasoline boiling range (for example, toluene), or mixtures thereof with lower or higher boiling hydrocarbons. An excellent concentrate is one wherein the fatty acid amide and the oil-soluble ammonium sulfonate are incorporated in methanol alone, thereby eliminating the need for any other hydrocarbon solvent carriers. The methanol content of the concentrate can vary from about 30 to over 95 percent by volume of the concentrate, with a particularly effective methanol concentration being about 95 volume percent. A preferred concentrate of the present invention has a composition as follows:

| | Volume percent |
|---|---|
| Fatty acid amide of hydroxyethyl ethylenediamine | 2.0 |
| Oil-soluble ammonium sulfonate | .5 |
| Methanol | 76.0 |
| Toluene | 20.0 |
| Mineral oil and thinner hydrocarbon solvents | 1.5 |
| | 100.0 |

As an illustration of the effectiveness of the subject additive combination in the improvement of spark-ignition engine fuels, the following examples are presented. In all of these examples, the oil-soluble ammonium sulfonate is derived from a petroleum mahogany sulfonic acid of an average molecular weight of around 490. The amide is the amide formed by the reaction of oleic acid and hydroxyethyl ethylenediamine at a temperature above about 230° F.

EXAMPLE I

This example illustrates the water absorption characteristics of the additive combination of the present invention in gasoline as compared to the absorption capacity of gasolines compounded with individual components of the subject combination. This is shown by the emulsifying action of the respective agents, inasmuch as the length of time required for the gasoline phase to clear after agitation is a good measure of its water absorption capacity. Thus, the longer time for the gasoline phase to clear, the better the emulsion, and the better the water absorption.

Each of the compositions listed in Table I below are composed of 75 volume percent of the identical base gasoline, slightly less than 25 volume percent water, 0.1 volume percent methanol, and the various addition agents in the amounts noted in the gasoline. In each case the compositions were vigorously agitated and then allowed to stand for one hour.

Table I

| Composition | Volume Percent Amide | Vol. Percent Ammonium Sulfonate | Appearance After 1 Hr. |
|---|---|---|---|
| A | 0.008 | None | Clear. No apparent emulsion. |
| B | 0.006 | None | Do. |
| C | None | 0.002 | Thin brown cuff. No apparent emulsion. |
| D | None | 0.0015 | Do. |
| E | 0.004 | 0.001 | Fine white emulsion. Water milky. |
| F | 0.004 | 0.0007 | Fine white emulsion. Water clear. |
| G | 0.003 | 0.001 | Do. |
| H | 0.003 | 0.0007 | Do. |
| I | 0.002 | 0.001 | Do. |
| J | 0.002 | 0.0007 | Do. |
| K | 0.001 | 0.001 | Do. |
| L | 0.001 | 0.0007 | Do. |
| M | None | None | Clear. No emulsion. |

From the above tabulation it can be seen that when the amide and the ammonium sulfonate are both present in the gasoline-water-methanol mixture, a desirable emulsion or dispersion of the water in the base fuel is formed and retains its characteristics for at least one hour. This must be contrasted with the situation when only one, either the amide or the sulfonate, is incorporated in the identical mixture. After standing one hour, the water-alcohol and gasoline phases have completely separated with no appearance of an emulsion or dispersion.

EXAMPLE II

This example further illustrates the water dispersing characteristics of the additive combination in the same manner as Example I above. Three additive concentrates were made with the following (Table II) compositions, the fatty acid amide and ammonium sulfonate being identical to those employed in Example I:

Table II

| Concentrate | Vol. Percent Amide | Vol. Percent Ammonium Sulfonate | Vol. Percent Methanol |
|---|---|---|---|
| N | 2.0 | 0.5 | 97.5 |
| O | 4.0 | | 96.0 |
| P | | 1.0 | 99.0 |

One volume percent of the above three blends were each added to a base commercial gasoline and vigorously agitated with 20 volume percent water. After allowing to stand for one hour, it was observed that, whereas all three showed the presence of an emulsion in the gasoline phase, the most stable emulsion was that gasoline that contained concentrate N. By a stable emulsion is meant that the gasoline phase was cloudy from the top to the bottom. The other gasoline phases, although cloudy on the bottom, were relatively clear at the top, thus showing that the emulsifying agents in concentrates O and P were not as effective as those in concentrate N.

From these facts, it can be further seen that the combination of the amide and the sulfonate is much superior for the prevention of an aqueous phase in fuel systems than either the amide or the sulfonate alone.

EXAMPLE III

This example shows the water absorption superiority of the present additive combination over the case where methanol alone is incorporated in the base fuel. Three samples of a commercial gasoline, two of the samples containing 0.94 volume percent methanol, were prepared. To one of the alcohol-containing gasoline samples was added 0.025 volume percent of the noted amide and 0.006 volume percent of the particular ammonium sulfonate. The samples were agitated with water, allowed to settle for one-half hour, the gasoline decanted, and the water content determined. It was found that the sample containing only methanol absorbed 7 percent more water than did the base fuel, but that the sample containing the methanol, amide and sulfonate absorbed 80 percent more water than the base gasoline.

EXAMPLE IV

This example illustrates the rust inhibiting characteristic of the composition of the present invention as contrasted with a gasoline containing only methanol. Two sets of three samples, identical to the three described in Example III, were prepared. The samples were then subjected to a slightly modified conventional rust test (ASTM Standards on Petroleum Products and Lubricants, ASTM–D665). Briefly, the method involves stirring a mixture of 300 ml. of the gasoline under test with 30 ml. of fresh and synthetic sea water at ambient temperature (approximately 70° F.) with a cylindrical steel specimen completely immersed therein. The test was run for 17 hours. Results were made visually, with a scale of 1 to 7 set up to show the degree of rusting. On the scale 1 indicates that the specimen is absolutely free of rust; 7 indicates completely covered with rust, with the numerals between these extremes indicating gradations thereof. Results are shown in Table III below:

Table III

| Composition | Fresh Water | Salt Water |
|---|---|---|
| Base Gasoline | 3.5 | 7 |
| Base Gasoline plus Methanol | 3 | 6.5 |
| Base Gasoline plus Additive Combination | 1 | 1 |

From the above table it can be seen that, under the test procedure outlined, complete protection against the rusting of steel was attained by the composition of the present invention.

EXAMPLE V

A test was conducted to determine the rate of water removal in an automobile operating on a water-contaminated gasoline compounded with 0.94 volume percent methanol, 0.025 volume percent of the amide formed by the reaction of oleic acid and hydroxyethyl ethylenediamine, and 0.006 volume percent of an oil-soluble ammonium sulfonate derived from a petroleum mahogany sulfonic acid.

The test automobile was a 1954 Ford V–8 modified only by the addition of a drain cock on the bottom of the gasoline tank.

Eight hundred ml. of water was poured into the fuel tank containing five gallons of gasoline. The gasoline (and all subsequent deliveries) were compounded as described above. The car was then operated on one trip per day over a standard three-mile course with occasional side trips. Just prior to making a trip, the water, which had been allowed to settle overnight, was drained from the tank and measured. The water was then returned to the tank. The test was made as severe as possible by allowing the test car to remain stationary overnight so that the maximum amount of water could settle out of of the gasoline in the fuel tank, fuel pump, and carburetor float bowl. In the following table, the amount of water remaining in the system after the enumerated test miles are shown.

Table IV

| Test miles: | Water in tank, ml. |
|---|---|
| 0 | 800 |
| 23 | 670 |
| 33 | 630 |
| 43 | 518 |
| 53 | 490 |
| 67 | 430 |
| 77 | 390 |
| 124 | 290 |
| 180 | 280 |
| 273 | 174 |
| 323 | 115 |

From the above table it can be seen that over one-half of the water present was harmlessly removed after only about 80 miles of operation and that over 80 percent of the water was removed at 323 miles. No serious malfunctioning of the automobile was observed at any time during the test.

EXAMPLE VI

A 1954 Mercury automobile was operated on base gasoline containing none of the additive combination of the present invention. Five hundred ml. of water were added to the fuel tank prior to the test. Periodically the water was drained from the tank, measured, and returned. The following measurements were observed:

Table V

| Test miles: | Water in tank, ml. |
|---|---|
| 0 | 500 |
| 5 | [1] 470 |
| 54 | 500 |
| 60 | [1] 505 |

[1] Obvious small errors in measurement.

Thus, after 60 miles of driving, it was apparent that no water was going to be removed from the tank by the gasoline under ordinary driving conditions. Therefore, 1000 ml. more of water were added to the tank and the gasoline was compounded with 0.94 volume percent methanol, 0.025 volume percent of the amide formed by the reaction of oleic acid and hydroxyethyl ethylenediamine, and 0.006 volume percent of an oil-soluble ammonium sulfonate derived from a petroleum mahogany sulfonic acid. Again, periodic measurements were made on the water content of the tank, with the water replaced following each measurement. The following measurements were taken:

Table VI

| Test miles: | Water in tank, ml. |
|---|---|
| 0 | 1500 |
| 25 | 510 |
| 57 | 305 |

At 120 test miles, 1000 ml. more of water were added, the automobile refueled with gasoline compounded with the subject additive in the identical amount shown above in this example, and the measurements continued.

Table VII

| Test miles: | Water in tank, ml. |
|---|---|
| 203 | 480 |
| 400 | 140 |

To determine the effect of the additive on ice formation within the fuel system, after 215 miles of operation with the additive of the present invention included in the base gasoline, the automobile was kept overnight at a temperature of 0° F. Approximately 475 ml. of water were in the tank at the time. The follownig morning the automobile started and warmed up normally with no indication that any ice had formed within the fuel system. The carburetor was inspected and water was found up to the main jet level. The emulsifying action of the additive combination of the present invention had carried the water through the fuel system in the absence of any freezing difficulties.

From the data set forth in the above examples it is clear that the improved fuel composition of the present invention provides a fuel that eliminates the heretofore serious problems of water contamination, namely, rusting, ice formation in tank, lines, pump or carburetor, and erratic engine performance.

It is understood that the specific examples and data herein presented are set forth only by way of illustration, and that the invention is not limited thereby or thereto, but is subject only to those limitations expressed in the following claims.

We claim:
1. An improved fuel composition suitable for use in spark-ignition internal combustion engines, said fuel composition consisting essentially of gasoline, and, based on the volume of the total fuel composition, a minor proportion from about 0.1 to about 5.0 volume percent of methanol, from about 0.001 to about 0.2 volume percent of an oleic acid amide of hydroxyethyl ethylene diamine, and from about 0.00025 to about 0.05 volume percent of an oil-soluble ammonium salt of a sulphonic acid characterized by the presence of an essentially hydrocarbon organic radical and having a molecular weight in the range from above about 400 to about 800.

2. An additive concentrate capable of incorporation into gasoline suitable for use as a fuel in spark-ignition internal combustion engines, said concentrate consisting essentially of methanol, and, based on the volume of methanol, from about 1.0 to about 4.0 volume percent of an oleic acid amide of hydroxyethyl ethylene diamine, and from about 0.25 to about 1.0 volume percent of an oil-soluble ammonium salt of sulphonic acid characterized by the presence of an essentially hydrocarbon organic radical and having a molecular weight in the range from above about 400 to about 800.

3. A solution in toluene of the additive concentrate of claim 2, wherein the methanol is present in a concentration of about 30 to about 95 volume percent.

References Cited in the file of this patent

UNITED STATES PATENTS

| 2,206,928 | Ulrich et al. | July 9, 1940 |
| 2,303,348 | Freeman et al. | Dec. 1, 1942 |
| 2,550,982 | Eberz | May 1, 1951 |
| 2,594,266 | Watkins | Apr. 22, 1952 |
| 2,646,348 | Neudeck | July 21, 1953 |
| 2,667,408 | Kleinholz | Jan. 26, 1954 |
| 2,681,354 | Kelley | June 15, 1954 |
| 2,706,677 | Duncan et al. | Apr. 19, 1955 |
| 2,789,891 | Brandes et al. | Apr. 23, 1957 |
| 2,839,373 | Barusch et al. | July 17, 1958 |